United States Patent [19]

Tsuge et al.

[11] Patent Number: 5,551,390
[45] Date of Patent: Sep. 3, 1996

[54] FUEL INJECTION CONTROL SYSTEM FOR INTERNAL COMBUSTION ENGINES

[75] Inventors: Masakuni Tsuge; Hidenobu Nagase, both of Wako, Japan

[73] Assignee: Honda Giken Kogyo Kabushiki Kaisha, Tokyo, Japan

[21] Appl. No.: 335,378

[22] Filed: Nov. 3, 1994

[30]    Foreign Application Priority Data

Nov. 5, 1993  [JP]  Japan .................................. 5-300885

[51] Int. Cl.⁶ .................................................. F02M 37/04
[52] U.S. Cl. ................................... 123/198 DB; 477/107
[58] Field of Search ........................... 123/357, 198 DB, 123/358, 359; 477/111, 112, 113

[56]              References Cited

U.S. PATENT DOCUMENTS

| 4,369,750 | 1/1983  | Muntean ........................... 123/198 DB |
| 4,449,495 | 5/1984  | Fiala .................................. 123/198 DB |
| 4,466,392 | 8/1984  | Uchida ............................... 123/198 DB |
| 4,700,590 | 10/1987 | Omitsu ..................................... 477/107 |
| 4,966,113 | 10/1990 | Fujimoto ........................... 123/198 DB |
| 4,993,389 | 2/1991  | Ahlborn .................................... 123/436 |
| 5,036,728 | 8/1991  | Kawasoe ................................... 477/107 |
| 5,421,305 | 6/1995  | Tomisawa ................................ 123/436 |

FOREIGN PATENT DOCUMENTS

| 3328044   | 2/1984 | Germany ................................ 123/357 |
| 3343018   | 6/1984 | Germany ........................... 123/198 DB |
| 60-32667  | 2/1984 | Japan ..................................... 123/357 |
| 59-126064 | 7/1984 | Japan . |

*Primary Examiner*—Carl S. Miller
*Attorney, Agent, or Firm*—Armstrong, Westerman, Hattori, McLeland & Naughton

[57]              ABSTRACT

A fuel injection control system for an internal combustion engine has at least one unit injector for injecting fuel into each cylinder, and an actuator provided for each of the at least one unit injector for varying the stroke of a plunger of the each unit injector. When a rise ratio of rotational speed of the engine calculated exceeds a predetermined value, the actuator is shifted to a predetermined position, thereby preventing an abnormal rise in the rotational speed of the engine. Similarly, when a no-load condition of the engine is detected, the actuator is shifted to a predetermined position.

6 Claims, 6 Drawing Sheets

FUEL INJECTION CONTROL SYSTEM FOR INTERNAL COMBUSTION ENGINES

BACKGROUND OF THE INVENTION

1. Field of the Invention

This invention relates to a fuel injection control system for internal combustion engines, particularly diesel engines, and more particularly to a fuel injection control system of this kind which is provided with an actuator, such as a stepping motor, which operates to vary the delivery stroke of a plunger accommodated within each unit injector for pressure delivery of fuel, thereby controlling the amount of fuel injection.

2. Prior Art

The unit injector has an injection pump and a nozzle assembled in one body, and is capable of directly injecting an amount of fuel discharged by a plunger via the nozzle, and hence has recently come into wide use in fuel injection control systems for diesel engines. Metering means for unit injectors of this type has already been proposed e.g. by Japanese Provisional Patent Publication (Kokai) No. 59-126064, which is comprised of a stepping motor provided for each unit injector for varying the delivery stroke of a plunger of the unit injector to control an amount of fuel injection by the use of a stepping motor control signal delivered from a controller to each stepping motor.

In some conventional fuel injection control systems for diesel engines, a revolution limiter is used for control of the rotational speed of the engine, in order to prevent an excessive rise in the rotational speed of the engine.

However, if such a revolution limiter is applied to the above proposed fuel injection control system, the revolution limiter cannot perform desired control before the rotational speed of the engine reaches a predetermined value. Consequently, the control of the rotational speed of the engine by the revolution limiter requires driving an actuator such as the stepping motor at an excessively high response speed after the rotational speed of the engine has reached the predetermined value, making it difficult to positively prevent an abnormal rise in the rotational speed of the engine. Further, the revolution limiter is incapable of preventing an abnormal rise in the rotational speed of the engine under all possible operating conditions of the engine.

SUMMARY OF THE INVENTION

It is the object of the invention to provide a fuel injection control system for an internal combustion engine engine which is capable of preventing an abnormal rise in the rotational speed of the engine under all operating conditions of the engine, by detecting a no-load condition of the engine.

The term "no-load condition" used throughout the present specification means an operating condition (no-torque load condition) that load on the engine has suddenly decreased to such a small value as can be ignored relative to the torque of the engine then obtained.

To attain the above object, the present invention provides a fuel injection control system for an internal combustion engine having at least one cylinder, including at least one unit injector each provided for each of the at least one cylinder, for injecting fuel into the each of the at least one cylinder, the at least one unit injector each having a plunger, and actuator means engaging the plunger of each of the at least one unit injector, for varying a stroke of the plunger for pressure delivery of fuel to thereby control an amount of fuel injected into the each of the at least one cylinder.

The fuel injector control system according to a first aspect of the invention is characterized by comprising:

rise ratio-calculating means for calculating a rise ratio of rotational speed of the engine; and actuator shifting means for shifting the actuator means to a predetermined position when the rise ratio calculated by the rise ratio-calculating means exceeds a predetermined value.

Preferably, the actuator means comprises at least one stepping motor each coupled to the plunger of the each of the at least one unit injector, for rotatively driving the plunger.

The fuel injection control system according to a second aspect of the invention is characterized comprising:

no-load condition-detecting means for detecting a no-load condition of the engine; and actuator shifting means for shifting the actuator means to a predetermined position when the no-load condition of the engine is detected by the no-load condition-detecting means.

Preferably, the actuator means comprises at least one stepping motor each coupled to the plunger of the each of the at least one unit injector, for rotatively driving the plunger.

Preferably, if the engine is installed on a vehicle having a transmission, the no-load condition-detecting means detects the no-load condition of the engine by detecting a state in which no torque of the engine is transmitted by the transmission.

If the transmission is a manual transmission, the no-load condition-detecting means detecting the no-load condition of the engine by detecting a position of a clutch of the vehicle for disconnecting the engine from the transmission.

Alternatively, if the transmission is an automatic transmission having a shift lever, the no-load condition-detecting means detects the no-load condition of the engine by detecting a neutral position of the shift lever.

The above and other objects, features, and advantages of the invention will become more apparent from the following detailed description taken in conjunction with the accompanying drawings.

DETAILED DESCRIPTION

Next, the invention will be described in detail with reference to the drawings showing embodiments thereof.

Figure 1:
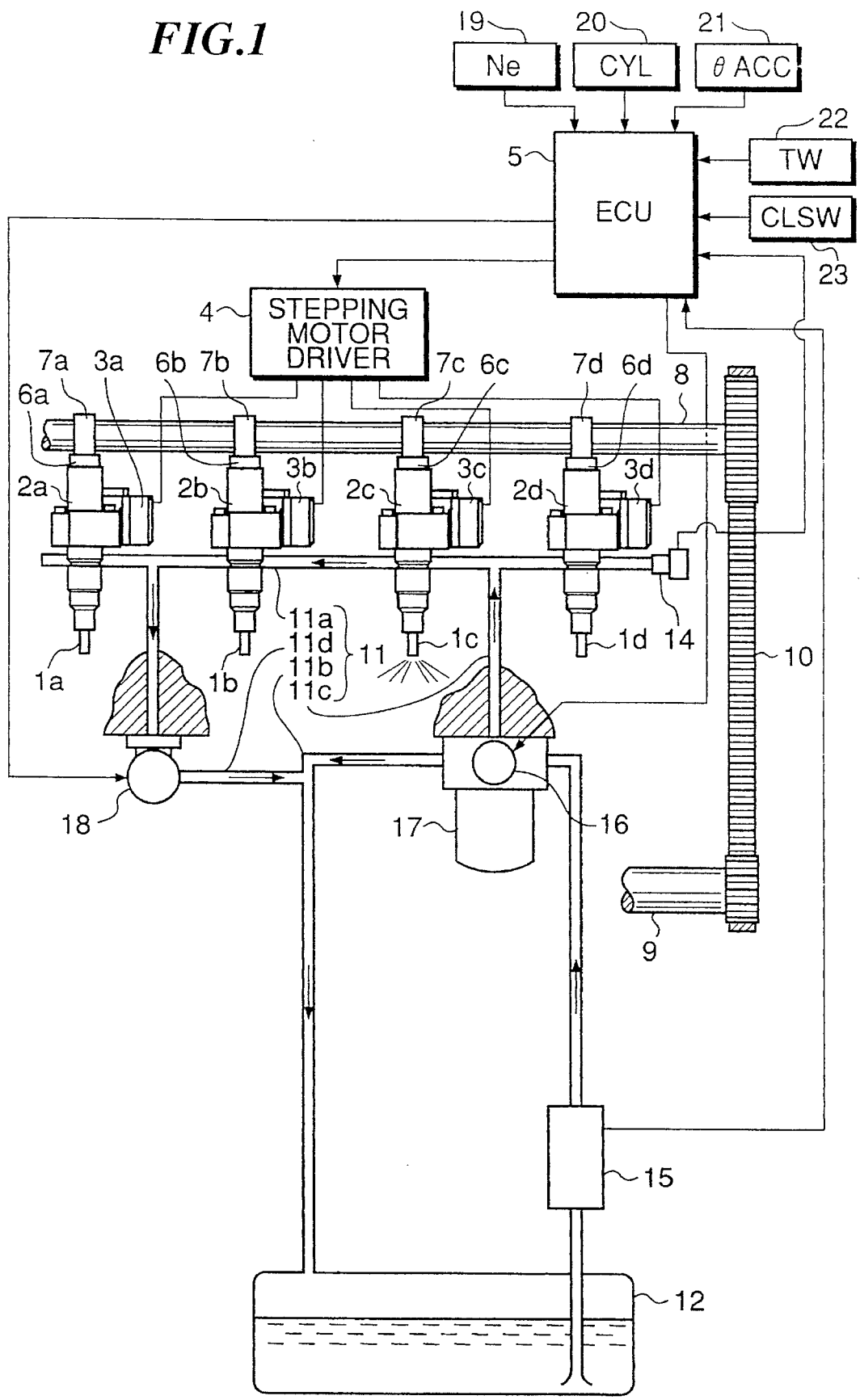
FIG. 1 is a schematic diagram showing the whole arrangement of a fuel injection control system for a diesel engine, according to a first embodiment of the invention.

Referring first to FIG. 1, there is schematically shown the arrangement of a fuel injection control system for a diesel engine, according to a first embodiment of the invention. The diesel engine is a four-cylinder type having unit injectors 2a to 2d provided in a cylinder head thereof, not shown, for respective cylinders. The unit injectors 2a to 2d are disposed to inject fuel via nozzles thereof 1a to 1d into respective combustion chambers, not shown. The unit injectors 2a to 2d have stepping motors 3a to 3d mounted on peripheral walls thereof and directly engaging with respective plungers, not shown, for varying the delivery strokes thereof. The stepping motors 3a to 3d are controlled by an electronic control unit (hereinafter referred to as "the ECU") 5 via a stepping motor driver 4 for electrically driving the stepping motors 3a to 3d.

The unit injectors 2a to 2d have cam followers 6a to 6d provided on the top thereof, which are cooperatively engaged with rocker arms 7a to 7d which slidably abut on a camshaft 8. The crankshaft 8 is connected to a crankshaft 9 of the engine by a timing belt 10 such that as the rotation of the crankshaft 9 is transmitted to the camshaft 8 via the timing belt 10, the rocker arms 7a to 7d make rocking motions.

The unit injectors 2a to 2d are connected via fuel supply passage means 11 to a fuel tank 12 such that fuel, such as light oil, held within the fuel tank 12 can be supplied to the unit injectors 2a to 2d.

More specifically, the fuel supply passage means 11 is comprised of a first fuel passage 11a connected to the unit injectors 2a to 2d, a second fuel passage 11b generally formed in the inverted "U" shape and having both ends thereof connected to the fuel tank 12, a third fuel passage 11c connecting between the second fuel passage 11b and the first fuel passage 11a for pressure feed of fuel to the first fuel passage 11a, and a fourth fuel passage 11d connecting between the first fuel passage 11a and the second fuel passage 11b for returning part of fuel pressure-fed to the unit injectors 2a to 2d, to the fuel tank 12.

A spill pressure sensor 14 is provided at a proper location of the first fuel passage 11a for detecting pressure (spill pressure) of fuel therein at termination of fuel injection from the unit injectors 2a to 2d to supply an electric signal indicative of the sensed spill pressure to the ECU 5.

A fuel pump 15 is arranged across the second fuel passage 11b at a location slightly downstream of the fuel tank 12, and electrically connected to the ECU 5 to have its operation controlled by a control signal delivered therefrom.

A fuel cut valve 16 and a filter 17 are provided at a joint connecting between the second fuel passage 11b and the third fuel passage 11c. The fuel cut valve 16 is electrically connected to the ECU 5 to have its operation controlled by a control signal delivered therefrom.

A pressure regulating valve 18 is arranged across the fourth fuel passage 11d for control of the fuel pressure based on a control signal delivered from the ECU 5.

During operation of the engine, as the fuel pump 15 is operated by the control signal from the ECU 5, fuel from the fuel tank 12 is supplied to the unit injectors 2a to 2d via the fuel supply passage means 11 (first to third fuel passages 11a to 11c), and upon termination of fuel injection, part of fuel spilled from the unit injectors 2a to 2d into the fuel supply passage 11 is returned via the pressure regulating valve 18 to the fuel tank 12. On the other hand, when the engine comes into stoppage, the fuel pump 15 is stopped by the control signal from the ECU 5, and at the same time the fuel cut valve 16 is closed to stop the fuel supply from the fuel tank 12 via the fuel supply passage means 11.

Further, an engine rotational speed (Ne) sensor 19 and a cylinder-discriminating sensor 20 are provided in facing relation to the camshaft 8 or crankshaft 9, and electrically connected to the ECU 5.

The Ne sensor 11 generates a pulse as a TDC signal pulse at each of predetermined crank angles corresponding to the top dead center of each cylinder whenever the crankshaft 9 rotates through 180 degrees, the pulse being supplied to the ECU 5.

The CYL sensor 20 delivers a pulse at a predetermined crank angle position of a particular cylinder whenever the crankshaft 9 effects two rotations, the pulse being supplied to the ECU 5.

An accelerator pedal opening ($\theta$ACC) sensor 21 is arranged in the vicinity of an accelerator pedal, not shown, for detecting an stepping amount of the accelerator pedal, and supplies an electric signal indicative of the sensed stepping amount to the ECU 5.

A coolant temperature (TW) sensor 22 is inserted in the cylinder head, not shown, for detecting the temperature of a coolant circulating therein, and supplies an electric signal indicative of the sensed coolant temperature to the ECU 5.

A clutch switch (CLSW) 23 is connected to a clutch pedal, not shown, of an automotive vehicle (MT vehicle) of a manual transmission type having a transmission manually operated in shifting its gear position, on which the engine is installed. The CLSW 23 turns on when the clutch pedal is operated, and supplies an electric signal indicative of the sensed operation of the clutch pedal to the ECU 5.

The ECU 5 is comprised of an input circuit having the functions of shaping the waveforms of input signals from various sensors mentioned above, shifting the voltage levels of sensor output signals to a predetermined level, converting analog signals from analog-output sensors to digital signals, and so forth, a central processing unit (hereinafter referred to as the "CPU"), memory means comprised of a ROM storing various operational programs which are executed by the CPU and various maps, referred to hereinafter, and a RAM for storing results of calculations therefrom, etc. and an output circuit which outputs driving signals to the stepping motor driver 4, the fuel cut valve 6, the pressure regulating valve 18, the purge control valve 16, and so forth.

Figure 2:
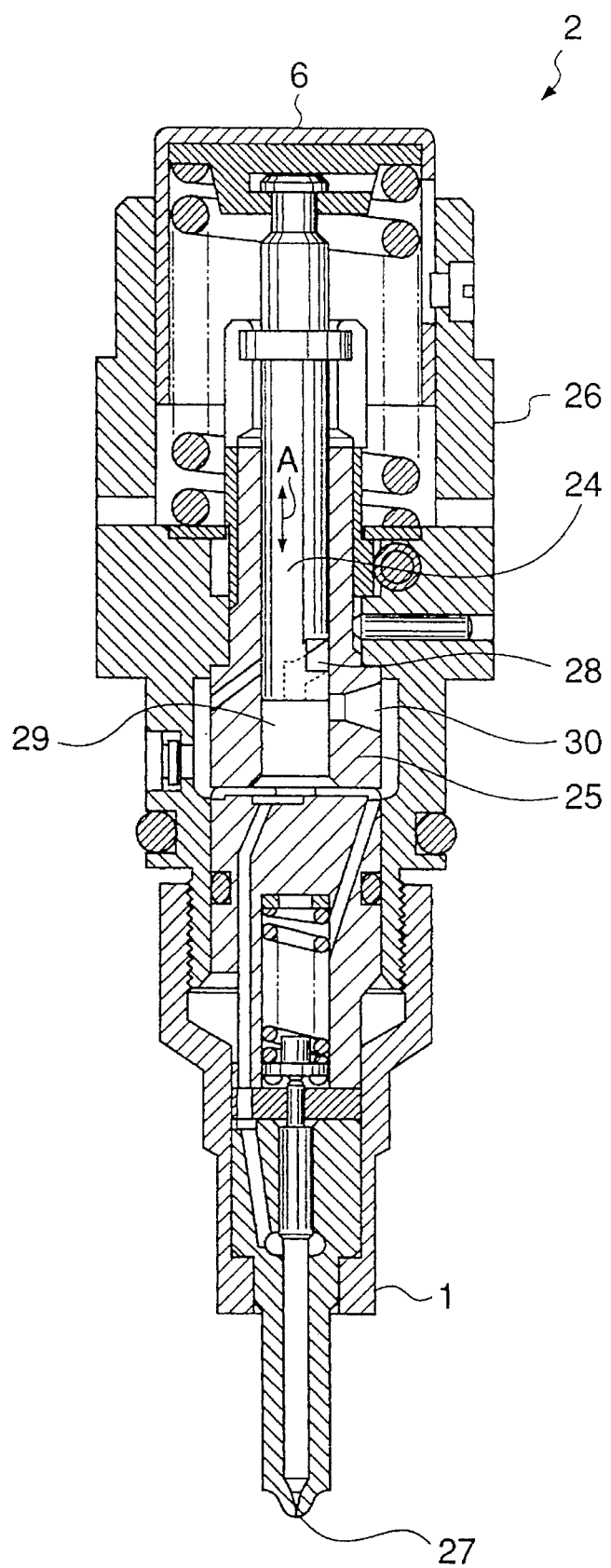
FIG. 2 is a longitudinal-sectional view of one of unit injectors appearing in FIG. 1.

FIG. 2 shows details of the construction of one of the unit injectors 2 (2a to 2d). As shown in the figure, the unit injector 2 is comprised of the aforementioned cam follower 6 disposed in sliding engagement with the rocker arm 7, a plunger 24 having its top coupled to the cam follower 6 in a manner being rotatable about its own axis, for reciprocating motions in the directions of the double-sided arrow A in unison with the cam follower 6, a plunger barrel 25 in which the plunger 24 is slidably received, a casing 26 enclosing the plunger barrel 25, and the nozzle 1 screwed in an open lower end of the unit injector 26, with an injection hole 27 formed therein.

The plunger 24 has a peripheral wall thereof formed therein with an injection amount control groove 28 extending obliquely with respect to the plunger axis and communicating with a high pressure chamber 29 formed below the plunger 24. The plunger barrel 25 has a peripheral wall thereof formed therethrough with a fuel supply hole 30, which communicates with the first fuel passage 11a (see FIG. 1). The plunger 24 is coupled to the stepping motor 3 (3a to 3d) to be driven for rotation by the latter, by coupling means, not shown, such that a change in its circumferential position causes a change in the axial position of the injection amount control groove 28 relative to the fuel supply hole 30.

The unit injectors 2 (2a to 2d) constructed as above operate in the following manner: When the plunger 24 moves downward as viewed from FIG. 2, the compression of fuel trapped in the high pressure chamber 29 starts at a time point the peripheral surface of the plunger 24 blocks off the fuel supply hole 30, and then the fuel trapped in the high pressure chamber is delivered under pressure via the nozzle 1 for injection. When the plunger 24 moves further downward to a point at which the fuel injection control groove 28 thereof meets the fuel supply hole 30 of the plunger barrel 25, the fuel within the high pressure chamber 29 starts to be spilled out into the first fuel passage 11a via the fuel supply hole 30, terminating the pressure delivery stroke of the plunger, i.e. the fuel injection by the unit injector. Further, for each cylinder of the engine, the stepping motor 3 (3a to 3d) causes the plunger 24 to vary its circumferential position, thereby varying the stroke of the plunger 24 for pressure delivery up to the point where the fuel supply control groove 28 meets the fuel supply hole 30, at which the pressure delivery of the fuel is terminated. This makes it possible to control the amount of fuel injection cylinder by cylinder.

Further, in the present embodiment, a no-load condition of the engine (no-torque load condition) is detected, and the rotors of the stepping motors 3a to 3d are each set to a predetermined position (no-torque load position) when the no-load condition of the engine is detected (actuator shift).

Figure 3:
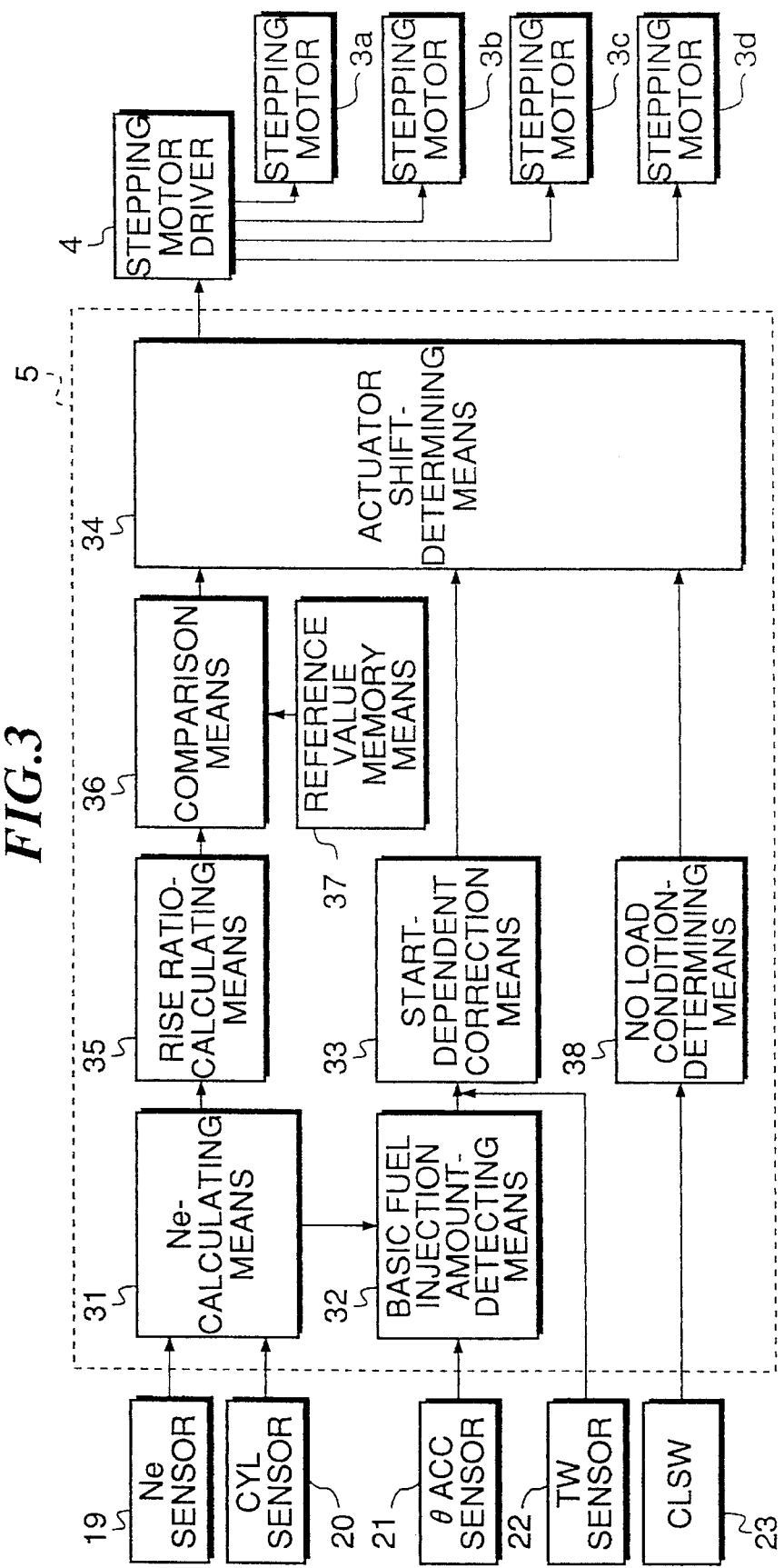
FIG. 3 is a block diagram showing the interior construction of an electronic control block of the fuel injection control system.

FIG. 3 shows the interior construction of an electronic control block of the fuel injection control system according to the present embodiment.

Signals delivered from the Ne sensor 19 and the CYL sensor 20 are supplied to Ne-calculating means 31 where time intervals Me of generation of TDC signal pulses from the respective cylinders are measured, and then the engine rotational speed Ne is calculated from the measured Me value. A signal indicative of the engine rotational speed Ne from the Ne-calculating means 31 is supplied to basic fuel injection amount-calculating means 32. On the other hand, a signal delivered from the θACC sensor 21 is also supplied to the basic fuel injection amount-calculating means 32. The basic fuel injection amount-calculating means 32 determines a basic fuel injection amount Ti by retrieving a Ti map according to the accelerator opening θACC and the engine rotational speed Ne. The Ti map is set such that predetermined map values correspond to predetermined values of the accelerator opening θACC and predetermined values of the engine rotational speed Ne. A signal indicative of the basic fuel injection amount Ti thus determined is supplied to start-dependent correction means 33 together with a signal delivered from the TW sensor 22. The start-dependent correction means 33 determines a coolant temperature-dependent correction coefficient KTW by retrieving a TW map according to the engine coolant temperature TW, and then corrects the basic fuel injection amount Ti by the use of the coolant temperature-dependent correction coefficient KTW to determine a fuel injection amount TOUT. A signal indicative of the determined TOUT value is supplied to actuator shift-determining means 34. The actuator shift-determining means 34 operates on the supplied TOUT value signal to supply a control signal via the stepping motor driver motor 4 to the stepping motors 3a to 3d. In this way, the fuel injection amount control is carried out in response to a starting condition of the engine.

On the other hand, the signal delivered from the Ne-calculating means 31 is also supplied to rise ratio-calculating means 35, where a rise ratio ΔNe/Ne of the engine rotational speed Ne is calculated, and an output signal indicative of the rise ratio ΔNe/Ne is delivered to comparison means 36, where the rise ratio ΔNe/Ne is compared with a predetermined reference value input from reference value memory means 37. A signal indicative of results of the comparison is delivered to the actuator shift-determining means 34. In other words, the comparison means 36 determines whether or not the engine has come into a no-load condition, and delivers a signal indicative of results of the determination to the actuator shift-determining means 34. Then, a signal delivered from the actuator shift-determining means 34 is supplied via the stepping motor driver 4 to the stepping motors 3a to 3d to thereby control the fuel injection amount according to results of the comparison by the comparison means 36.

Further, a signal from the clutch switch CLSW 32 is supplied to no-load condition-determining means 38, where it is determined whether or not the engine is about to enter a no-load condition, and delivers a signal indicative of results of the determination to the actuator shift-determining means 34. In this case as well, the signal delivered from the actuator shift-determining means 34 is supplied via the stepping motor driver 4 to the stepping motors 3a to 3d to thereby control the fuel injection amount according to results of the determination by the no-load condition-determining means 38.

Figure 4:
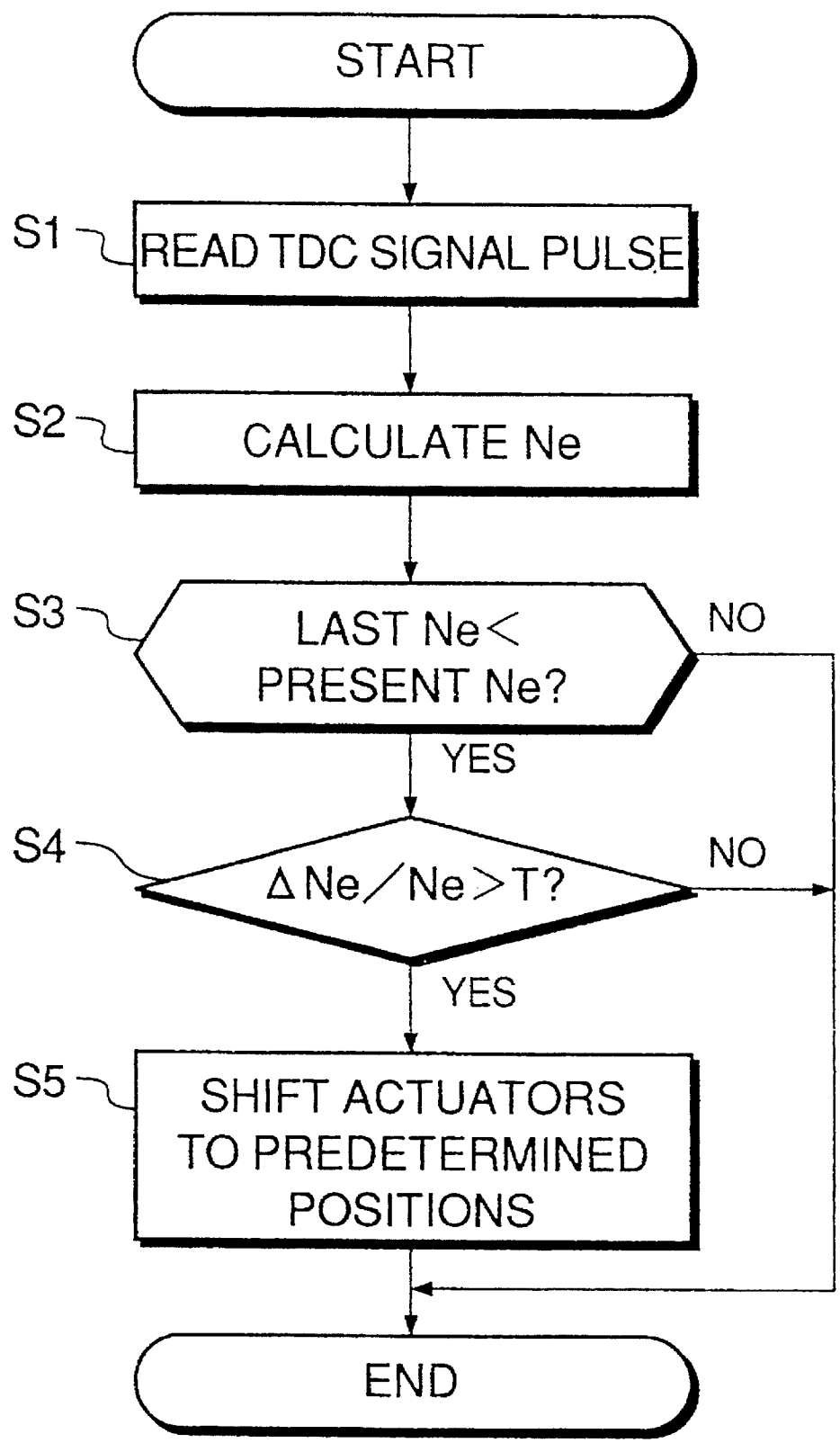
FIG. 4 is a flowchart of a routine for determining a no-load condition of the engine based on an output from an engine rotational speed sensor and carrying out fuel supply control by the fuel injection control system.

FIG. 4 shows a routine for determining a no-load condition of the engine, based on the signal indicative of the sensed Ne from the Ne sensor, and controlling the fuel supply amount. This program is executed e.g. in synchronism with generation of TDC signal pulses.

First, at a step S1, a TDC signal pulse is read in, and then at a step S2, the engine rotational speed Ne is calculated from the read TDC signal pulse and the immediately preceding read TDC signal pulse.

Then, at a step S3, a value (immediately preceding value) of the engine rotational speed calculated in the immediately preceding loop is compared with a value (present value) of same calculated in the present loop, to thereby determine whether the former Ne value is smaller than the latter Ne value. If the answer to this question is negative (No), the program is immediately terminated, whereas if the answer is affirmative (YES), the program proceeds to a step S4, where a difference ΔNe between the present value and the immediately preceding value of the engine rotational speed Ne is calculated, a rise ratio ΔNe/Ne of the rotational speed of the engine is calculated, and then it is determined whether or not the rise ratio ΔNe/Ne is larger than a predetermined value T.

If the rise ratio ΔNe/Ne is equal to or smaller than the predetermined value T, the program is immediately terminated, while if the rise ratio ΔNe/Ne is larger than the predetermined value T, it is judged that the engine rotational speed Ne is abnormally increasing with the engine operating in a no-load condition. Then, the program proceeds to a step 85, where the rotors of the stepping motors are each shifted or set to a predetermined position, i.e. a predetermined reference position suitable for the no-load condition of the engine, followed by terminating the program. By thus setting the rotors of the stepping motors to the predetermined position, the fuel injection amount is controlled to a value suitable for the no-load condition of the engine, whereby an abnormal rise in the engine rotational speed is restrained.

In this way, irrespective of the engine rotational speed, when a no-load condition of the engine is detected, the actuator (stepping motor) is driven to a predetermined position, whereby it is possible to prevent an abnormal rise in the engine rotational speed without requiring an excessively high response speed of the actuator.

Figure 5:
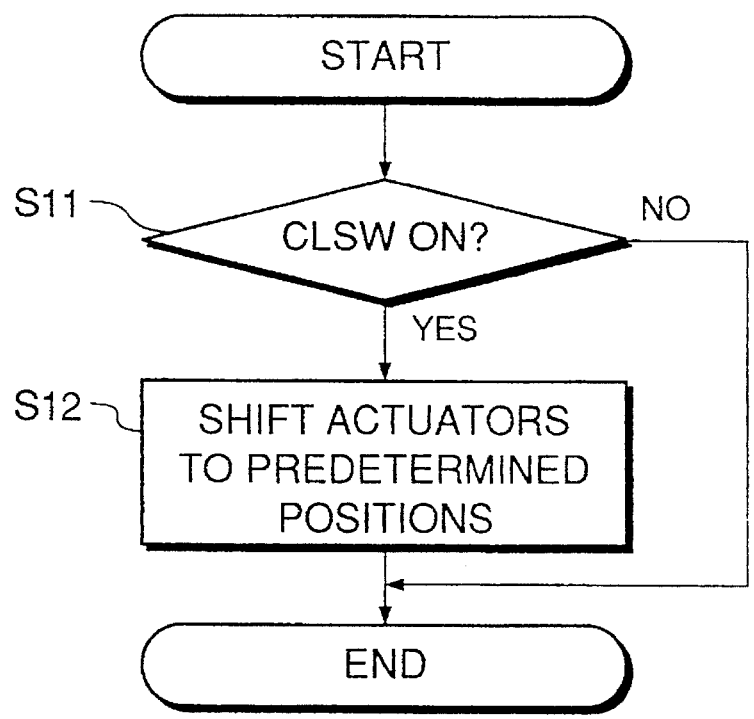
FIG. 5 is a flowchart of a routine for determining a no-load condition of the engine based on a state of engagement of a clutch of the engine and carrying out fuel supply control by the electronic control system.

FIG. 5 shows a routine for determining a no-load condition of the engine based on a state of engagement of the clutch and carrying out fuel supply control. This program is executed e.g. in synchronism with generation of TDC signal pulses.

At a step S11, it is determined whether or not the CLSW 23 has turned on. If the answer to this question is negative (NO), the present program is immediately terminated, whereas if the answer is affirmative (YES), the program proceeds to a step S12, where the rotors of the stepping motors are each shifted to the predetermined reference position suitable for the no-load condition of the engine, followed by terminating the program. By thus setting the rotors of the stepping motors to the predetermined position, the fuel injection amount is controlled to a value suitable for the no-load condition of the engine, whereby an abnormal rise in the engine rotational speed is restrained. In this way, immediately before the engine enters a no-load condition, the actuator (stepping motor) is driven to a predetermined position, whereby it is possible to prevent an abnormal rise in the engine rotational speed, which would occur when the engine actually enters the no-load condition, without requiring an excessively high response speed of the actuator.

Although in the above embodiment, the present invention is applied to an MT vehicle with a manual transmission, this is not limitative, but it may be applied to an AT vehicle with an automatic transmission.

Figure 6:
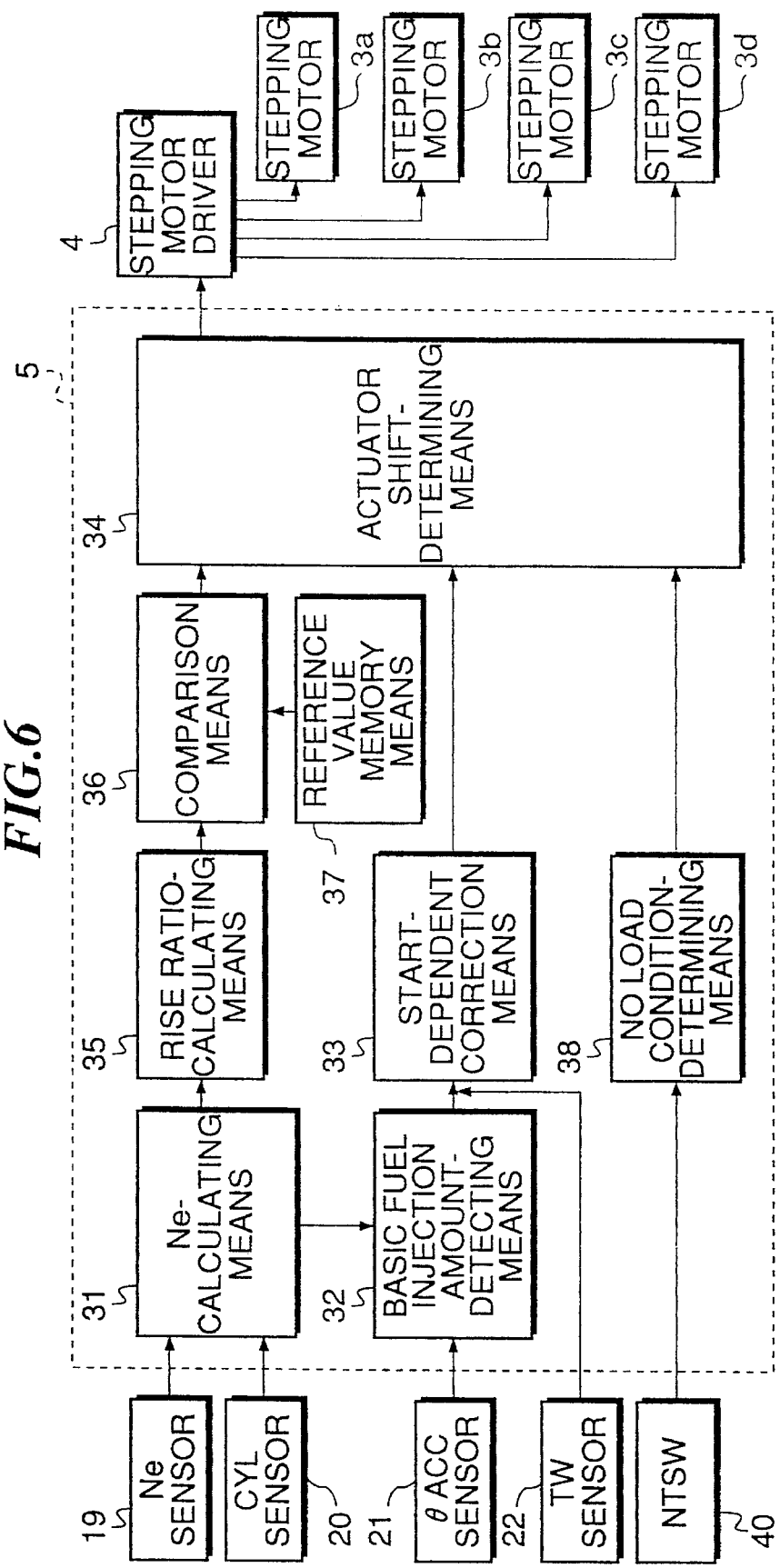
FIG. 6 is a block diagram showing the interior construction of an electronic control block of the fuel injection control system for a diesel engine, according to a second embodiment of the invention.

Next, a second embodiment of the invention will be described in which the invention is applied to the AT vehicle. This embodiment is distinguished from the first embodiment described above in that a neutral position switch NTSW 40 is provided, as shown in FIG. 6 in place of the clutch switch CLSW 23 appearing in FIG. 1 and FIG. 3 showing the first embodiment. The NTSW 40 is adapted to turn on when a shift lever of the transmission has been operated to a neutral position, and supplies a predetermined electric signal to the no-load condition-determining means 38 shown in FIG. 6. The other elements and parts of the arrangement of the fuel injection control system according to the second embodiment are identical in construction and function to those of the first embodiment, and hence detailed description thereof is omitted.

Figure 7:
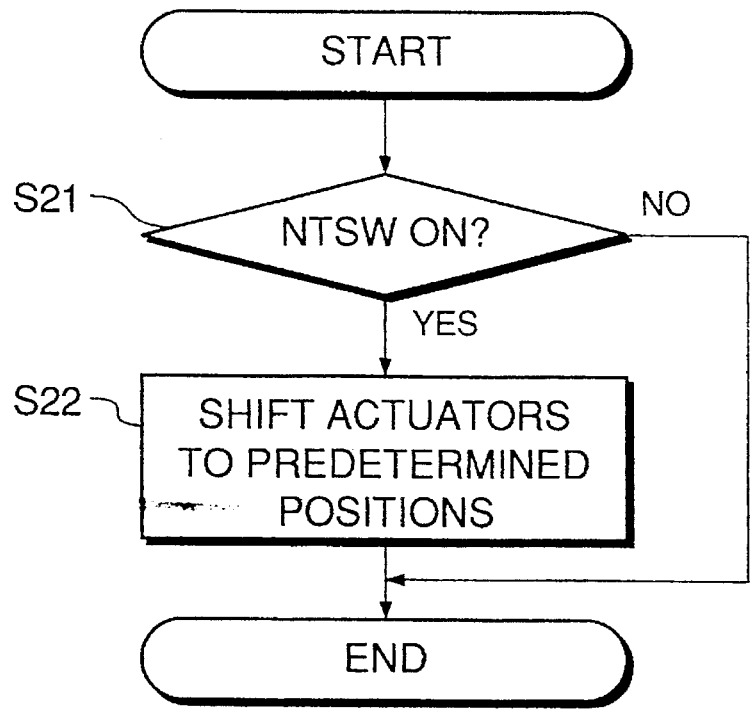
FIG. 7 is a flowchart of a routine for determining a no-load condition of the engine based on the position of a neutral position switch, and carrying out fuel supply control by the electronic control system according to the second embodiment of the invention.

FIG. 7 shows a routine for determining a no-load condition of the engine based on the position of the neutral position, and carrying out fuel supply control.

Referring to FIG. 7, at a step S21, it is determined whether or not the NTSW 40 has turned on. If the answer to this question is negative (NO), the program is immediately terminated, whereas if the answer is affirmative (YES), the program proceeds to a step S22, where the rotors of the stepping motors are each shifted to a predetermined reference position suitable for the no-load condition of the engine, followed by terminating the program.

According to the second embodiments as well, similar results to those obtained by the control based on the clutch state according to the first embodiment can be provided.

What is claimed is:

1. A fuel injection control system for an internal combustion engine, comprising:

at least one cylinder, including at least one unit injector each provided for each of said at least one cylinder, for injecting fuel into said each of said at least one cylinder, said at least one unit injector each having a plunger;

actuator means engaging said plunger of each of said at least one unit injector, for varying a stroke of said plunger for pressure delivery of fuel to thereby control an amount of fuel injected into said each of said at least one cylinder;

no-load condition-detecting means for detecting a no-load condition of said engine; and actuator shifting means for shifting said actuator means to a predetermined position, which makes it possible to prevent an abnormal rise in the rotational speed of said engine under said no-load condition, when said no-load condition of said engine is detected by said no-load condition-detecting means.

2. A fuel injection control system according to claim 1, wherein said actuator means comprises at least one stepping motor each coupled to said plunger of said each of said at least one unit injector, for rotatively driving said plunger.

3. A fuel injection control system according to claim 1, wherein said engine is installed on a vehicle having a transmission, said no-load condition-detecting means detecting said no-load condition of said engine by detecting a state in which no torque of said engine is transmitted by said transmission.

4. A fuel injection control system according to claim 3, wherein said transmission is a manual transmission, said vehicle having a clutch capable of assuming a position for disconnecting said engine from said transmission, said no-load condition-detecting means detecting said no-load condition of said engine by detecting said position of said clutch.

5. A fuel injection control system according to claim 3, wherein said transmission is an automatic transmission having a shift lever capable of assuming a neutral position for disconnecting said engine from said transmission, said no-load condition-detecting means detecting said no-load condition of said engine by detecting said neutral position of said shift lever.

6. A fuel injection control system according to claim 1, wherein said no-load condition-detecting means includes rise ratio-calculating means for calculating a rise ratio of rotational speed of said engine, and wherein said no-load condition-detecting means detects that said engine is operating in said no-load condition when said rise ratio calculated by said rise ratio-calculating means exceeds a predetermined value.

* * * * *